United States Patent
Kapoor et al.

(10) Patent No.: US 8,611,942 B2
(45) Date of Patent: Dec. 17, 2013

(54) HANDLING OF MAC-HS/EHS RESET IN ENHANCED SERVING CELL CHANGE

(75) Inventors: Rohit Kapoor, San Diego, CA (US); Sharad Deepak Sambhwani, San Diego, CA (US); Hailiang Cai, San Diego, CA (US); Srinivasa Eravelli, San Diego, CA (US); Yun Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 12/495,947

(22) Filed: Jul. 1, 2009

(65) Prior Publication Data

US 2010/0167779 A1 Jul. 1, 2010

Related U.S. Application Data

(60) Provisional application No. 61/089,678, filed on Aug. 18, 2008.

(51) Int. Cl.
*H04B 7/00* (2006.01)

(52) U.S. Cl.
USPC ............ 455/522; 455/69; 455/436; 455/439; 370/331; 370/332

(58) Field of Classification Search
USPC .......... 455/436, 437, 522, 439, 450, 70, 442, 455/69, 509, 502, 423, 425; 370/331, 332, 370/329, 333, 349, 352, 249, 252, 342, 278, 370/345, 335, 441
See application file for complete search history.

(56) References Cited

U.S. PATENT DOCUMENTS

| | | | |
|---|---|---|---|
| 2001/0055968 A1* | 12/2001 | Yoshida et al. | 455/436 |
| 2003/0232622 A1* | 12/2003 | Seo et al. | 455/437 |
| 2005/0148357 A1* | 7/2005 | Sipila et al. | 455/522 |

(Continued)

FOREIGN PATENT DOCUMENTS

| | | |
|---|---|---|
| CN | 1906963 A | 1/2007 |
| EP | 1341318 A2 | 9/2003 |

(Continued)

OTHER PUBLICATIONS

Alcatel: "RLC, MAC andHARQ context transfer for intra-eNB handover" 3GPP Draft; R2-063328_RLC, MAC and HARQ Context Transfer for Intra-ENB Handover, SRD Generation Partnership Project (3GPP), Mobile Competence Centre ; 650, Route Des Lucioles ; F-06921.

(Continued)

*Primary Examiner* — Edward Urban
*Assistant Examiner* — Golam Sorowar
(74) *Attorney, Agent, or Firm* — Charles Chesney

(57) ABSTRACT

Systems and methodologies are described that effectuate and/or facilitate MAC-hs/ehs resets in an enhanced serving cell. In accordance with various aspects set forth herein, systems and/or methods are provided that identify transmission power control bits included in active set update messages received from source or target base stations, ascertain whether or not transmission power control values included in the active set update messages differ from transmission power control values that the system currently operates under, and performs serving cell changes and where necessary media access control status resets based on an examination of a transmission power control combination index.

20 Claims, 15 Drawing Sheets

(56) References Cited

U.S. PATENT DOCUMENTS

| | | | |
|---|---|---|---|
| 2006/0121901 A1* | 6/2006 | Tanaka et al. | 455/436 |
| 2007/0099618 A1* | 5/2007 | Kim | 455/436 |
| 2008/0188224 A1* | 8/2008 | Pani et al. | 455/436 |
| 2008/0192848 A1 | 8/2008 | Kuo | |

FOREIGN PATENT DOCUMENTS

| | | |
|---|---|---|
| JP | 2003298509 A | 10/2003 |
| JP | 2008206149 A | 9/2008 |
| JP | 2011511577 A | 4/2011 |
| RU | 2237975 C1 | 10/2004 |
| RU | 2251220 C2 | 4/2005 |
| WO | 03019819 A1 | 3/2003 |
| WO | 2005025253 A1 | 3/2005 |
| WO | 2008097486 A2 | 8/2008 |
| WO | WO2009097481 A1 | 8/2009 |

OTHER PUBLICATIONS

International Search Report and Written Opinion—PCT/US2009/054088—ISA/EPO—Feb. 12, 2010.

Qualcomm Europe: "Handling of MAC-hs/ehs reset in Enhanced Serving Cell Change" 3 GPP Draft; R2-084610, 3rd Generation Patnership Project (3GPP), Mobile Competence Centre; 650, Route Des Lucioles; F-06921 Sophia-Antipolis Cedex; France, No. Jeju; Aug. 19, 2008, XP050319623.

Alcatel: "RLC, MAC and HARQ context transfer for intra-eNB handover" 3GPP Draft; R2-063328_RLC, MAC and HARQ Context Transfer for Intra-ENB Handover, SRD Generation Partnership Project (3GPP), Mobile Competence Centre; 650, Route Des Lucioles; F-06921, Nov. 1, 2006, URL, http://www.3gpp.org/ftp/tsg_ran/WG2_RL2/TSGR2_56/Documents/R2-063328.zip.

Taiwan Search Report—TW098127767—TIPO—Dec. 17, 2012.

* cited by examiner

HANDLING OF MAC-HS/EHS RESET IN ENHANCED SERVING CELL CHANGE

CROSS-REFERENCE TO RELATED APPLICATIONS

This application claims the benefit of U.S. Provisional Patent application Ser. No. 61/089,678 entitled "HANDLING OF MAC-HS/EHS RESET IN ENHANCED SERVING CELL CHANGE" which was filed Aug. 18, 2008. The entirety of the aforementioned application is herein incorporated by reference.

BACKGROUND

I. Field

The following description relates generally to wireless communications, and more particularly to handing MAC-hs/ehs resets in enhanced serving cell changes in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Conventionally, during a physical channel reconfiguration or similar radio resource control (RRC) message the radio network controller (RNC) can indicate to an access terminal or user equipment whether or not a media access control (MAC)-hs/ehs should be reset during a serving cell change. Typically, for intra-Node B serving cell changes the MAC-hs/ehs need not be reset, whereas for inter-Node B serving cell changes the MAC-hs/ehs can be reset. However, in the enhanced serving cell change procedure, information about serving cell is normally pre-configured. Accordingly, a technique for handling MAC-hs/ehs resets in an enhanced serving cell change procedure needs to be devised.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with effectuating and/or facilitating media access control (MAC)-hs/ehs resets in an enhanced serving cell change. The claimed subject matter posits a number of different techniques for accomplishing media access control (MAC)-hs/ehs resets under different circumstances. As part of the enhanced serving cell change procedure, an access terminal or user equipment can be pre-configured with serving cell related information for each member in its active set. Nevertheless, there can be some complexity involved in pre-configuring information about MAC-hs/ehs resets since at the time of an active set update it generally is not know which cell will trigger a serving cell change.

One technique for handling the MAC-hs/ehs reset is to pre-configure such information which can involve for each cell in the active set, pre-configuring information regarding whether or not an access terminal or user equipment should reset the MAC-hs/ehs if any other cell in the active set becomes the serving cell. An additional and/or alternative procedure for handling MAC-hs/ehs resets can be for the access terminal or user equipment can check the transmission power control (TPC) combination index and perform a MAC-hs/ehs reset where the transmission power control (TPC) combination index for the new serving cell is different from that for the current serving cell. A further technique for handling MAC-hs/ehs resets can be to utilize one bit of the high-speed shared control channel (HS-SCCH) order employed in the enhanced serving cell change procedure to indicate MAC-hs/ehs resets. Additionally and/or alternatively, MAC-hs/ehs resets can be accomplished by undertaking a MAC-hs/ehs reset for every serving cell change regardless of whether or not the serving cell change is an intra-Node B serving cell change or an inter-Node B serving cell change.

The claimed subject matter in accordance with various aspects set forth herein discloses an apparatus operable in a wireless communication system, wherein the apparatus comprises a processor, configured to identify a transmission power control bit included in an active set update message, ascertain whether a transmission power control value included in the active set update message differs from the transmission power control value that the apparatus currently operates under, perform a serving cell change and based at least in part on an examination of a transmission power control combination index, perform a media access control status reset. Further the apparatus also includes a memory coupled to the processor for persisting data.

In accordance with a further aspect, the claimed subject matters discloses an apparatus operable in wireless communication systems, the apparatus comprises a memory that retains instructions related to locating a transmission power control bit included in an active set update message, distinguishing between a transmission power control value included in the active set update message from the transmission power control value that the apparatus currently operates under, undertaking a serving cell change, and based at least in part on an investigation of a transmission power control combination index, performing a media access control status reset. Additionally, the apparatus also includes a processor, coupled to the memory, configured to execute the instructions retained in memory.

Further, the claimed matter, in accordance with additional aspects, discloses a method utilized in wireless communication systems, wherein the method includes identifying a transmission power control bit included in an active set update message, ascertaining whether a transmission power control value included in the active set update message differs from the transmission power control value that an apparatus currently operates under, and performing a serving cell change that includes undertaking a media access control status reset based at least in part on an analysis of a transmission power control combination index.

Moreover, the claimed subject matter, in accordance with yet a further aspect discloses an apparatus operable in wireless communication systems, wherein the apparatus includes means for identifying a transmission power control bit included in an active set update message, means for ascertaining whether a transmission power control value included in the active set update message differs from the transmission power control value that a means for receiving is currently subject to, and means for performing a media access control status reset based at least in part on an examination of a transmission power control combination index.

Furthermore, the claimed subject matter in accordance with further aspects, discloses a computer program product that comprises a computer-readable medium. The computer-readable medium can comprise code for identifying a transmission power control bit included in an active set update message, code for ascertaining whether a transmission power control value included in the active set update message differs from the transmission power control value that an apparatus currently operates under, and code for performing a serving cell change that includes code for undertaking a media access control status reset wherein the media access control status reset is based at least in part on an examination of a transmission power control combination index.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
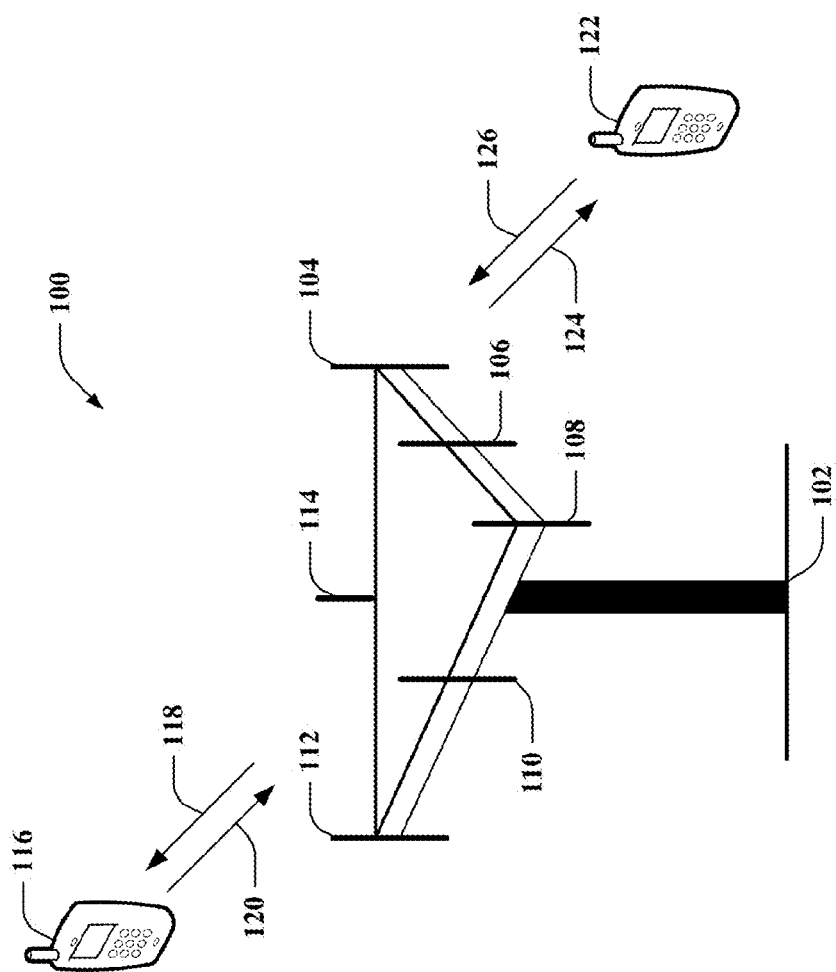
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
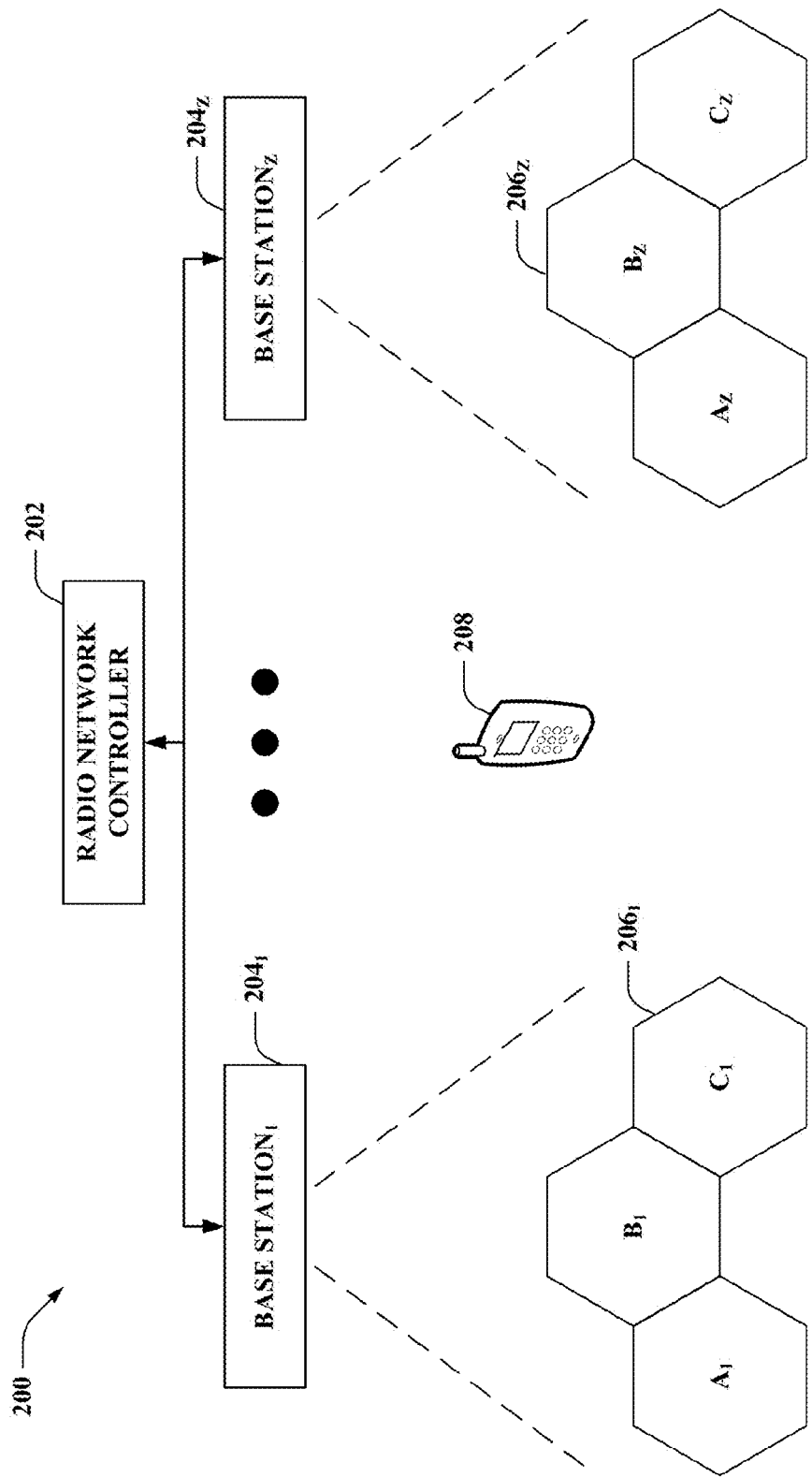
FIG. 2 is an illustration of an example system that effectuates and/or facilitates MAC-hs/ehs resets associated with an enhanced serving cell change in a wireless communication environment.

FIG. 2 illustrates a system 200 that effectuates and/or facilitates MAC-hs/ehs resets in an enhanced serving cell change in accordance with various aspects of the claimed subject matter. As illustrated system 200 can include a radio network controller 202 that can be responsible for control over base stations or Node Bs $204_1 \ldots 204_Z$. Radio network controller 202 can be the governing element in the universal mobile telecommunications system (UMTS) terrestrial radio access network (UTRAN) responsible for control of base stations or Node Bs $204_1 \ldots 204_Z$. As will be appreciated by those reasonably conversant in this field of endeavor, radio network controller 202 can implement the various strategies and algorithms necessary for controlling parameters such as transmit power, channel allocation, handover criteria, modulation scheme, error code scheme, etc. to utilize the limited radio spectrum resources and radio network infrastructure as efficiently as possible. Additionally, radio network controller 202 can also provide mobility management facilities and/or functionalities necessary to track where subscribers are (e.g., via access terminal, mobile device, or user equipment 208) so that calls and other mobile phone services can be delivered to them. Moreover, radio network controller 202 is typically the point where encryption/decryption is performed before user data is sent to and/or from access terminal 208.

As stated above, system 200 can also include base stations or Node Bs $204_1, \ldots, 204_Z$ (herein after referred to as "base stations 204") that typically are utilized to communicate directly with one or more mobile device, access terminal, or user equipment 208 situated within the ambit of multiple cells 206, such as, for example, cells $206_1, \ldots, 206_Z$, wherein the one or more cells $206_1$ is controlled or serviced by base station or Node B $204_1$ and the one or more cells $206_Z$ is controlled or serviced by base station or Node B $204_Z$ respectively. It should be noted without limitation or loss of generality, that while only three cells are illustrated as being controlled or serviced by each of base station or Node B $204_1$ and base station or Node B $204_Z$, a greater or fewer number of cells can be controlled or serviced by its corresponding base station or Node B. Additionally, it should also be noted that each of the one or more cells $206_1$ and one or more cells $206_Z$ can be divided into one or more sectors comprising further cells.

Also illustrated in FIG. 2 is access terminal 208 that can be in continuous and/or operative or sporadic and/or intermittent communication with base station 204 and/or with the greater cellular system or core network (e.g., $3^{rd}$ Generation (3G) cellular systems) through facilities and functionalities provided by radio network controller 202. Access terminal 208, as exemplified above in context with access terminals 116 and 122, can be implemented entirely in hardware and/or a combination of hardware and/or software in execution. Further, access terminal 208 can be incorporated within and/or be associated with other compatible components. Additionally, access terminal 208 can be, but is not necessarily limited to, any type of machine that includes a processor and/or is capable of effective communication with the core network through the facilities provided by radio network controller 202. Illustrative machines that can comprise access terminal 208 can include portable desktop computers, cellular phones, smart phones, laptop computers, notebook computers, Tablet PCs, consumer and/or industrial devices and/or appliances, hand-held devices, personal digital assistants, multimedia Internet mobile phones, multimedia players, and the like.

Accordingly, as access terminal 208 traverses between cells 206, access terminal 208 can perform a handoff serving cell change as it transitions between cells. For instance, as access terminal 208 moves between the cells $206_1$ controlled by base station $204_1$ (e.g., cells depicted as $A_1$, $B_1$, and $C_1$) access terminal 208 can perform a handoff serving cell change as it crosses the cell boundary separating the cells from one another. For example, where access terminal 208 traverses from cell $A_1$ to $B_1$ in cells $206_1$ controlled or serviced by base station $204_1$, a handoff serving cell change undertaken by access terminal 208 can be necessary. The handoff serving cell change performed in this instance can be referred to as an intra-Node B serving cell change as cells $206_1$ within which access terminal 208 is traversing to or from (e.g., cells depicted as $A_1$, $B_1$, and $C_1$) are controlled by the same base station (e.g., Node B) $204_1$.

Where on the other hand, access terminal 208 moves between cells $206_1$ controlled or serviced by base station $204_1$ (e.g., cells depicted as $A_1$, $B_1$, and $C_1$) to cells $206_Z$ controlled or serviced by base station $204_Z$ (e.g., cells depicted as $A_Z$, $B_Z$, and $C_Z$) a similar handoff serving cell change can also be effectuated, however, in this instance, the handoff serving cell change can be referred to as an inter-Node B serving cell change, as access terminal 208 is transitioning between cells controlled or serviced by different or disparate base stations or Node Bs (e.g., cells $206_1$ controlled or serviced by base station $204_1$ to cells $206_Z$ controlled or serviced by base station $204_Z$).

Nevertheless, regardless of whether or not access terminal 208 is moving between cells controlled or serviced by the same base station and needs to effectuate an intra-Node B handoff serving cell change or is moving between cells controlled or serviced by disparate base stations and actuates an inter-Node B handoff serving cell change, a determination has to be made as to whether or not such a handoff serving cell change warrants a MAC-hs/ehs reset to be undertaken.

The media access control (MAC) typically provides sequence numbers that indicate to access terminal 208 the order in which packets are being, or are to be, received. Accordingly, since media access control (MAC) information, as a rule, resides on the base station (e.g., Node B), where the access terminal 208 transitions between cells controlled or serviced by the same base station 204 (e.g., intra-Node B) there typically is no point in resetting the media access control (MAC) state. Conversely, where the access terminal 208 transitions between cells controlled or serviced by different base stations (e.g., inter-Node B), there can be a need to reset the media access control (MAC) state, since the base station 204 to which the access terminal 208 is transitioning may not have associated or persisted with it the media access control (MAC) information pertinent to the transitioning access terminal 208.

To date, in order to accomplish a serving cell change, radio network controller (RNC) 202, through the base station 204 currently serving the access terminal 208, can send a radio resource control (RRC) message to the access terminal 208. The radio resource control (RRC) message can inform the access terminal 208 to perform a serving cell change and also indicates whether or not to perform a media access control (MAC) reset. Typically, the radio network controller (RNC) 202 detects whether access terminal 208 is crossing, or is about to cross, into a cell different than the cell in which the access terminal 208 is currently situated. Where the cell into which the access terminal 208 traverses to is controlled by the same base station 206 that controlled the cell from which the access terminal 208 traversed from, then when the radio network controller (RNC) 202 dispatches the radio resource control (RRC) message, via the currently controlling base station 204, to the access terminal 208 to undertake a serving cell change procedure, the radio resource control (RRC) message can also provide indication to the access terminal 208 that it need not perform a media access control (MAC) status reset in addition to the serving cell change. Where on the other hand, the cell into which the access terminal 208 traverses to is controlled by a base station 204 disparate from the one that is currently controlling the cell from which the access terminal 208 is traversing from, then the radio network controller (RNC) 202 dispatches a radio resource control (RRC) message, once again through the currently controlling base station 204, to the access terminal 208 that it (e.g., the access terminal 208) should undergo both a serving cell change as well as a media access control (MAC) status reset. The problem with this current arrangement is that since reception from the currently serving cell is becoming weaker and where the signal strength from the current serving cell is dropping rapidly, there is a likelihood that the access terminal 208 may not have sufficient signal strength to receive the notifications included in the radio resource control (RRC) message dispatched from radio network controller (RNC) 202.

In order to overcome the aforementioned deficiency, the claimed subject matter, instead of sending radio resource control (RRC) messages from the base station servicing or controlling the source cell, can dispatch physical layer signaling from the base station servicing or controlling the target cell (e.g., the cell that is to become the new serving cell). The physical layer signaling disseminated from the base station that will service or control the target cell can be sent as high speed shared control channel (HS-SCCH) orders (e.g., a combination of bits). Under this conception, access terminal 208 can commence monitoring the target cell and at some point when it receives a high speed shared control channel (HS-SCCH) ordering from the target cell, the access terminal 208 can at that point switch to being controlled by the target cell and its associated base station. Nevertheless, while utilization of physical layer signaling resolves the problem of failing to receive radio resource control (RRC) messages from weakening cells, physical layer signaling, and in particular high speed shared control channel (HS-SCCH) protocols have predetermined formatting that is typically not amenable to carrying too much information. Accordingly, without some slight modification, information as to whether or not to perform a MAC-hs/ehs reset generally cannot be indicated through physical layer signaling.

Given this perceived constraint in the utilization of physical layer signaling, the claimed subject matter, as discussed below, can employ the following additional and/or alternative techniques to indicate to access terminal 208 whether or not it should perform an inter-Node B serving cell change or an intra-Node B serving cell change, and whether or not a media access control (MAC) status reset should be undertaken.

Figure 3:
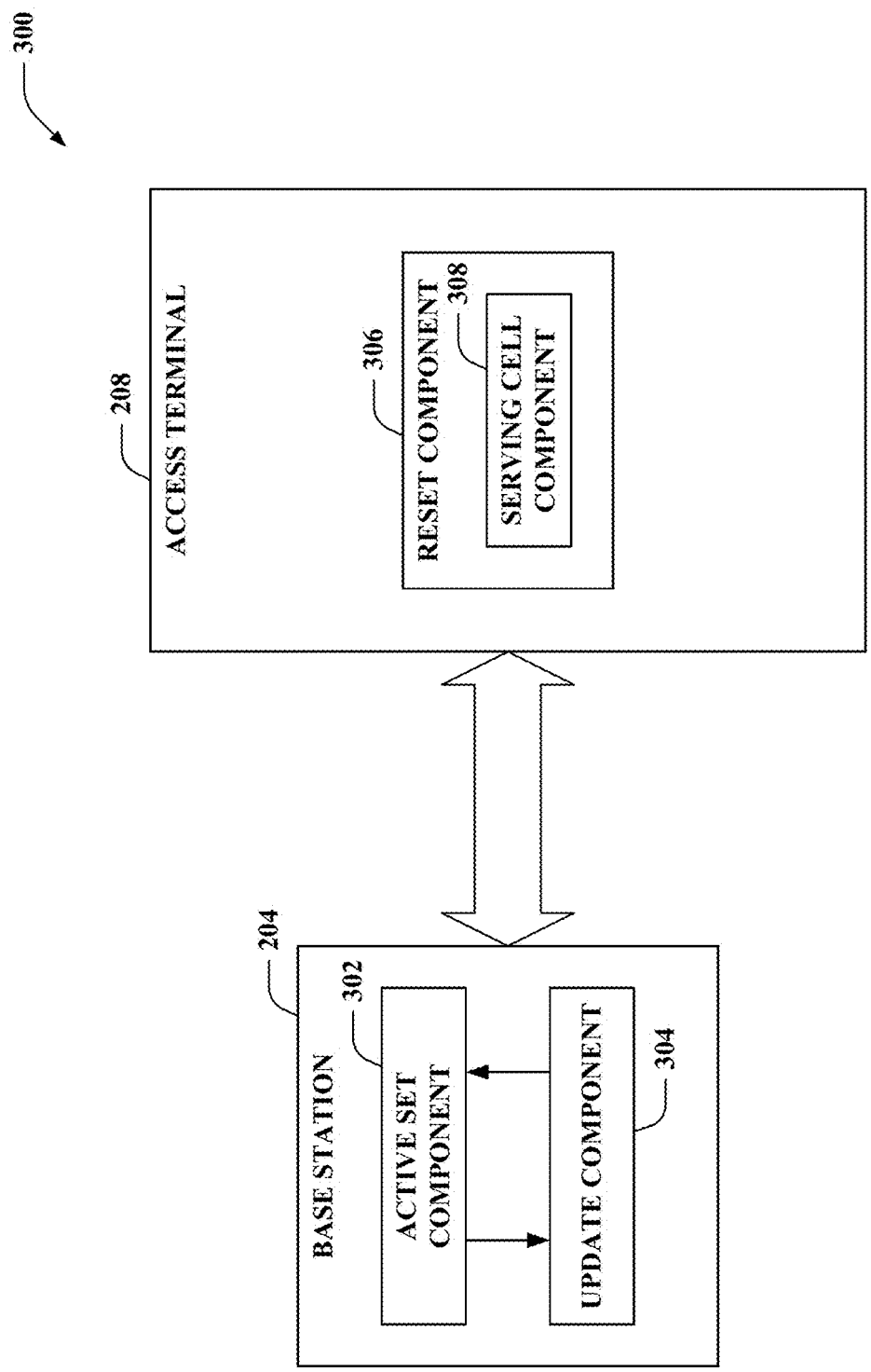
FIG. 3 is an illustration of an example system that effectuates and/or facilitates MAC hs/ehs resets associated with an enhanced serving cell change in a wireless communication environment.

FIG. 3 depicts a system 300 that effectuates and/or facilitates MAC hs/ehs resets in an enhanced serving cell change in accordance with various aspects of the claimed subject matter. As illustrated, system 300 can include base station 204 that can be in continuous and/or operative or sporadic and/or intermittent communication with access terminal 208. Since the basic functionality of base station 204 and access terminal 208, respectively, have been explicated above, a detailed description of such features has been omitted to avoid needless repetition and for the sake of brevity and conciseness. Nevertheless as depicted, base station 204 can include active set component 302 and update component 304. Active set component 302 can be a repository for the cells that are controlled or serviced by a particular base station 204 and update component 304 can be utilized to disseminate information regarding the appropriate cell to which access terminal 208 should associate with. For example, where access terminal 208 is operating within a current cell that is the serving cell (e.g., cell A) but it is ascertained that signals emanating from another cell (e.g., cell B) are becoming somewhat stronger but not necessarily as strong as signals emitted from the current serving cell (e.g., cell A), access terminal 208 can dispatch to base station 204 a measurement report indicating that the signals from cell B are coming close to the signals emanating from cell A. Base station 204, through the facilities and functionalities provided by active set component 302 and/or update component 304, on receiving the measurement report can dispatch an active set update message indicating that access terminal 208 should add cell B to its active set. Moreover, as part of the active set update message base station 204 can also indicate to access terminal 208 that a serving cell change can be imminent by providing a 1-bit value which can indicate to access terminal 208 how it should perform the imminent serving cell change.

Further as illustrated in FIG. 3, system 300 can include access terminal 208 that further includes reset component 306 and serving cell component 308 that in conjunction and/or individually can effectuate a serving cell change based at least in part on an active set update message received from base station 204. In particular, in accordance with an aspect of the claimed subject matter, reset component 306 can detect that signals emanating from the current serving cell (e.g., cell A) are becoming weaker while signals being emitted from another cell (e.g., cell B) are becoming stronger in relation to the current serving cell. Upon perceiving the relative loss of strength of signals originating from the current serving cell (e.g., cell A) in relation to gradual strengthening of signals produced from another cell (e.g., cell B) reset component 306 can generate and dispatch a measurement report to the base station 204 controlling or servicing the current serving cell (e.g., cell A) indicating that signals from another cell (e.g., cell B) are becoming stronger while signals originating from the current serving (e.g., cell A) are undergoing a gradual diminution. Once reset component 306 has sent the measurement report to the base station 204 controlling or servicing the current serving cell (e.g., cell A), serving cell component 308 can await a response from the base station 204 controlling or servicing the current serving cell (e.g., cell A) regarding whether or not the newly detected cell (e.g., cell B) with its gradually strengthening signal emission should be added to an active set persisted or associated with access terminal 208. The response provided by base station 204 can be in the form of an active set update message that can inform access terminal 208, and in particular serving cell component 308 that the newly detected cell (e.g., cell B) should be added to the active set of cells that are currently persisted or associated with access terminal 208 and maintained by serving cell component 308. Additionally, included in the active set update message dispatched from the base station 204 controlling or servicing the current serving cell (e.g., cell A) can be indication that access terminal 208, through the functionalities provided by reset component 306, should perform a serving cell change. This additional information can be conveyed in the active set update message by a 1-bit value which informs access terminal 208 the manner in which the serving cell change should be performed.

Figure 4:
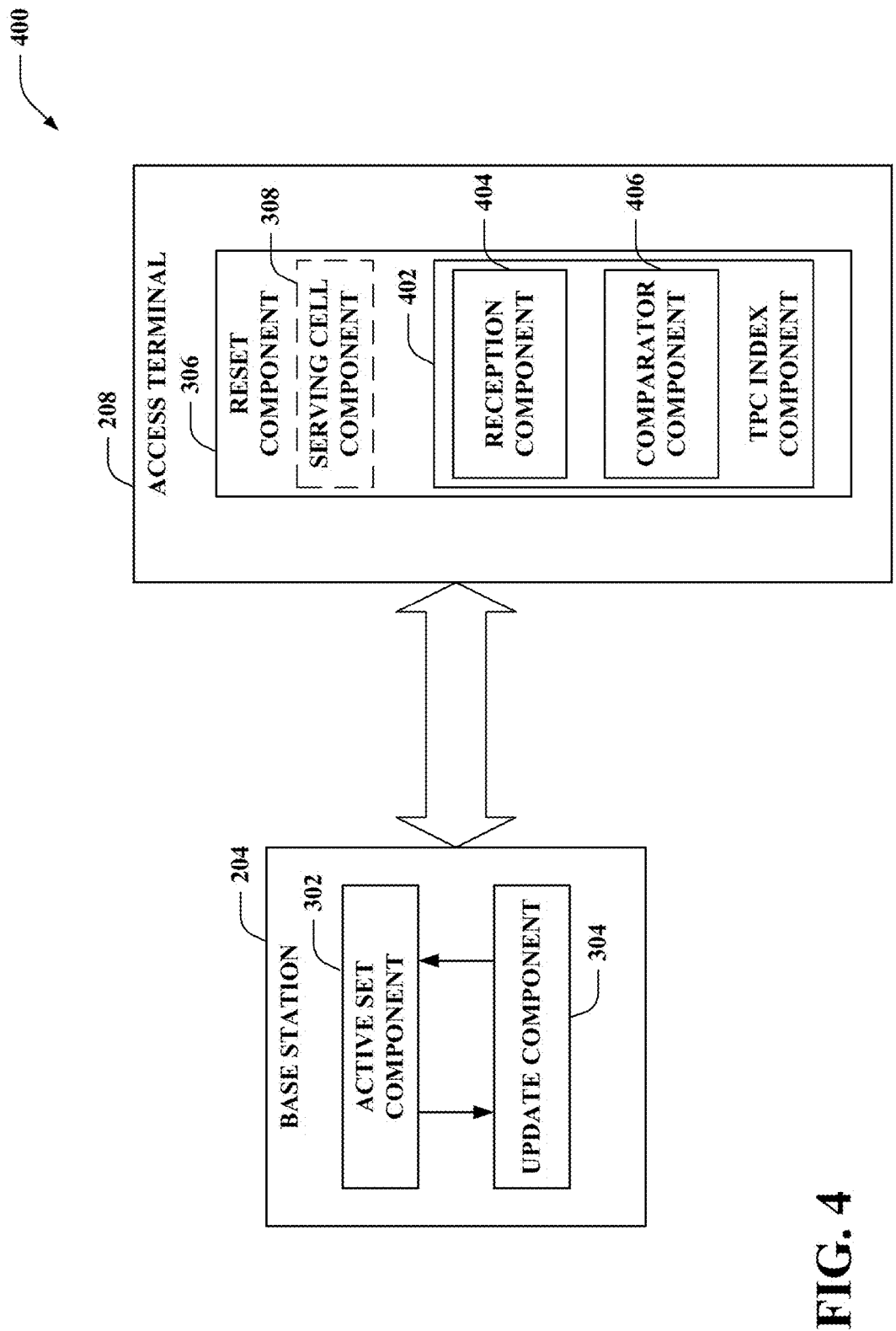
FIG. 4 is a further illustration of an example system that effectuates and/or facilitates MAC hs/ehs resets associated with an enhanced serving cell change in a wireless communication environment.

FIG. 4 provides further depiction of a system 400 that facilitates and/or effectuates MAC hs/ehs resets in an enhanced serving cell change in accordance with various aspects of the claimed subject matter. Illustrated therein are base station 204 that includes active set component 302 and update component 304 and access terminal 208 that includes reset component 306 and serving cell component 308 the basic facilities and functionalities of which have been expounded upon in relation to FIG. 3 above. Accordingly, a detailed description of the objectives of these components has been omitted to avoid needless prolixity and for the sake of conciseness. Nonetheless, as illustrated, reset component 306, in addition to serving cell component 308, can include transmission power control (TPC) index component 402 that can investigate (e.g., parse) the active set update message disseminated by base station 204 to locate transmission power control (TPC) bits that typically inform access terminal 208 to transmit at higher or lower power levels as circumstances dictate.

Typically, transmission power control (TPC) bits can function in the following manner. For example, where two cells are controlled by the same base station (e.g., base station 204) the transmission power control (TPC) values (also known as the transmission power control (TPC) combination) provided to access terminal 208 can be the same or similar. Thus for instance, where a first base station (e.g., NB1) services or controls two cells (e.g., C1 and C2) and a second base station (e.g., NB2) services or controls one cell (e.g., C3), the transmission power control (TPC) combination sent to C1 and C2 by the first base station (NB1) can be referred to as transmission power control (TPC) combination index 0 and the transmission power control (TPC) combination sent by the second base station (e.g., NB2) to C3 can be referred to as transmission power control (TPC) combination index 1. It should be noted without limitation or loss of generality that since cells C1 and C2 are serviced or controlled by the same base station (e.g., NB1) the transmission power control (TPC) combination index 0 associated with these cells will typically be the same or similar, whereas transmission power control (TPC) combination index 1 associated with C3 will differ from transmission power control (TPC) combination index 0. Accordingly, where access terminal 208 traverses between cells (e.g., C1 and C2) under the control of the same base station (e.g., NB1) investigation of the transmission power control (TPC) combination index will indicate that the source and target cells (e.g., C1 and C2) are controlled by the same base station (e.g., NB1) and thus no media access control (MAC) status reset need be performed. Conversely, where access terminal 208 traverses between cells (e.g., C1 and C3 or C2 and C3) controlled or serviced by different base stations (e.g., NB1 and NB2) there can be a disparity between the transmission power control (TPC) combination index which can indicate that a media access control (MAC) status reset should be undertaken.

In view of the foregoing therefore transmission power control (TPC) index component 402 can include reception component 404 that can receive and inspect, scrutinize, or scan the active set update message received from base station 204 to identify the transmission power control (TPC) bits. Where reception component 404 locates or identifies the presence of transmission power control (TPC) values or a transmission power control (TPC) combination it can convey this information to comparator component 406. On receipt of the transmission power control (TPC) combination, comparator component 406 can determine whether or not the transmission power control (TPC) combination included in the active set update message received from base station 204 is the same or similar to the transmission power control (TPC) combination that access terminal 208 is currently operating under. Where comparator component 406 ascertains that the transmission power control (TPC) combination is the same or similar to that under which access terminal 208 is operating under, this can be indicative that no media access control (MAC) status reset is necessary since the current base station 204 (e.g., NB1) actually controls or services both the source and target cells (e.g., C1 and C2) to which access terminal 208 is transitioning. Where on the other hand, comparator component 406 establishes that there is a disparity between the transmission power control (TPC) combination under which access terminal 208 is currently operating under and the transmission power control (TPC) combination that has been dispatched and included in the received active set update message from the base station 204 currently controlling or servicing the access terminal 208, comparator component 406 can infer that a media access control (MAC) status reset is, or will be, immanent or impending since access terminal 208 evidently is transitioning between cells (e.g., traversing between C1 and C3, or C2 and C3) controlled by different base stations 204 (e.g., NB1 and NB2), and as such, comparator component 406 can direct reset component 306 to perform a media access control (MAC) status reset to accommodate the transition.

Figure 5:
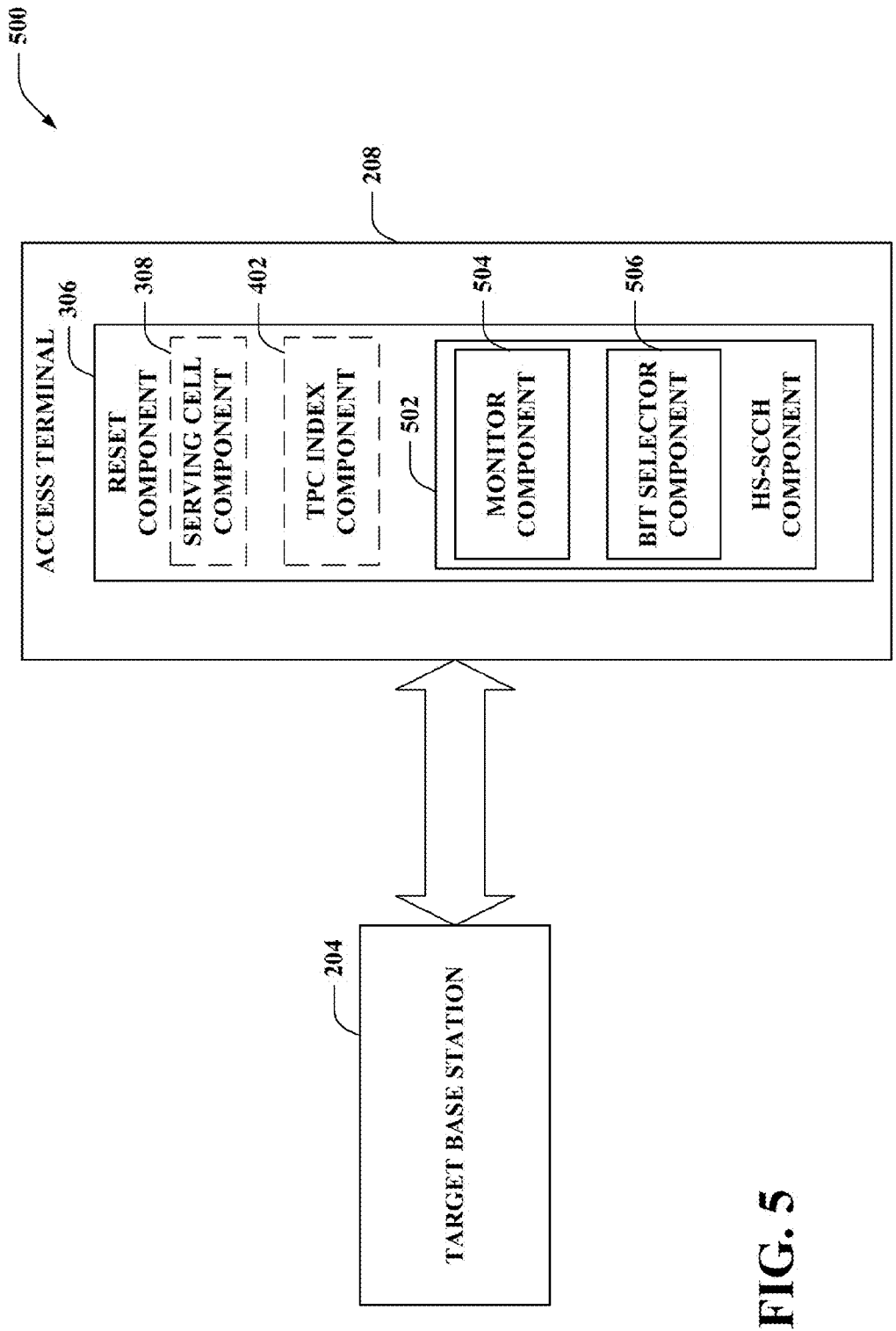
FIG. 5 is yet another illustration of an example system that effectuates and/or facilitates MAC hs/ehs resets associated with an enhanced serving cell change in a wireless communication environment.

FIG. 5 illustrates a further system 500 that effectuates and/or facilitates handling MAC-hs/ehs resets in an enhanced serving cell change in accordance with various aspects of the claimed subject matter. As illustrated, system 500 can include target base station 204 the functionality and/or facilities of which have been elucidated above in connection with base station 204 in general. Additionally, system 500 can also include access terminal 208 which can further include reset component 306 that can additionally include serving cell component 308 and transmission power control (TPC) index component 402. Since the facilities and/or functionalities of access terminal 208 and reset component 306 and its various sub-components expounded upon to this point have already been discussed above, a further discussion of these attributes have been omitted for the sake of brevity. Nevertheless as depicted, reset component 306 can also include high speed shared control channel (HS-SCCH) component 502 that can monitor the physical layer signaling originating from a target base station 204 that ultimately may take control over communications with or by access terminal 208. As was alluded to above, since physical layer signaling, and in particular, high speed shared control channel (HS-SCCH) protocols, in of themselves are not typically amenable to carrying too much further information, one bit of the currently spare or available bits included in the high speed shared control channel (HS-SCCH) ordering can be utilized to indicate whether or not a media access control (MAC) status reset should be undertaken. Thus, when access terminal 208, under the auspices of high speed shared control channel (HS-SCCH) component 502, receives physical layer signaling from a target base station 204, it (e.g., access terminal 208) can ascertain from one of the two currently spare bits included in the high speed shared control channel (HS-SCCH) ordering and constituent within the received physical layer signaling whether or not a media access control (MAC) status reset should be undertaken.

Accordingly and as illustrated in FIG. 5, reset component 208 includes high speed shared control channel (HS-SCCH) component 502 that further includes monitor component 504 and bit selector component 506. Monitor component 504 can automatically and continuously monitor for physical layer signaling from target base station 204. Target base station 204 can have been directed by a radio network controller (e.g., radio network controller (RNC) 202) that since access terminal 208 is in close proximity to, or is crossing, a cell boundary, that it (e.g., target base station 204) should send out physical layer signals to alert access terminal 208 and that it (e.g., target base station 204) will be controlling the cell into which the access terminal 208 is entering.

Where monitor component 504 detects or ascertains physical layer signaling from target base station 204, it can convey such signaling to bit selector component 506 that can investigate the received physical layer signaling for high speed shared control channel (HS-SCCH) orders that can indicate whether an intra-Node B or inter-Node B serving cell change is warranted. This indication can be conveyed as a 1-bit value. For example, where bit selector component 506 detects that the 1-bit value in the high speed shared control channel (HS-SCCH) order is 0, then this can indicate that an intra-Node B serving cell change is necessary (e.g., the cells from which, and to which, access terminal 208 is traversing is controlled by the same base station and the source base station and the target base station are the same). Conversely, where bit selector component 506 detects that the 1-bit value in the high speed shared control channel (HS-SCCH) order is 1, then this can indicate that an inter-Node B serving cell change is required (e.g., the cells from which, and to which, access terminal 208 is traversing are controlled or serviced by different base stations; the source base station and the target base station are different). In a further example under a slightly different conception, where bit selector component 506 detects that the 1-bit value in the high speed shared control channel (HS-SCCH) order is 0, then this can be indicative that an inter-Node B serving cell change is warranted; whereas if the 1-bit value in the high speed shared control channel (HS-SCCH) order is 1, then this can provide indication that an intra-Node B serving cell change is necessary. It is to be appreciated, without limitation or loss of generality, that where an inter-Node B serving cell change is effectuated, as opposed to an intra-Node B serving cell change, that a media access control (MAC) status reset can be actuated by reset component 306.

Figure 6:
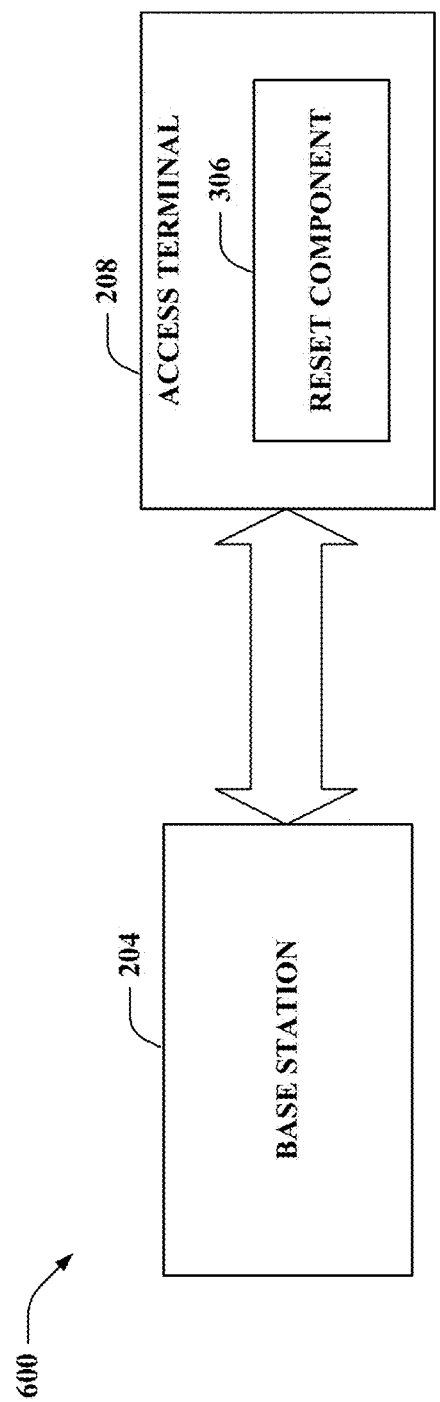
FIG. 6 is an illustration of yet another example system that effectuates and/or facilitates MAC hs/ehs resets associated with an enhanced serving cell change in a wireless communication environment.

FIG. 6 illustrates a system 600 that facilitates and/or effectuates the handling of MAC-hs/ehs resets in an enhanced serving cell change in accordance with various aspects of the claimed subject matter. As illustrated system 600 can include base station 204 and access terminal 208 which includes reset component 306. Base station 204 in accordance with this aspect of the claimed subject matter can provide indication to access terminal 208 that a serving cell change is necessary regardless of whether or not the cells into which, or from which, access terminal 208 is traversing are controlled by the same Node B or different Node B. More particularly, reset component 306 can undertake a serving cell change with an associated media access control (MAC) status reset every time that access terminal 208 traverses between two cells no matter whether or not the cell from which access terminal 208 is moving from or to is controlled by the same serving or controlling base station 204 (e.g., intra-Node B) or different from the current serving or controlling base station 204 (e.g., inter-Node B).

Referring to FIGS. 7-10, methodologies relating handling MAC-hs/ehs resets in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 7:
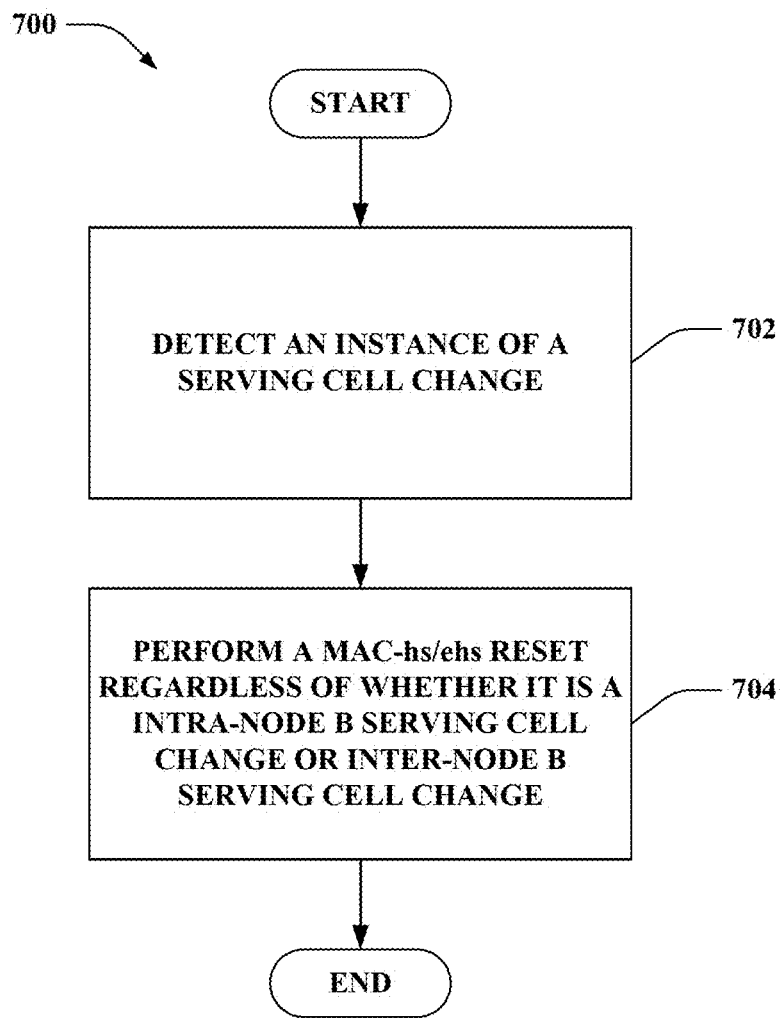
FIGS. 7-10 are illustrative example methodologies that that effectuate and/or facilitate MAC hs/ehs resets associated with an enhanced serving cell change in a wireless communication environment.

With reference to FIG. 7, illustrated is a methodology 700 that facilitates the handling of MAC-hs/ehs resets in an enhanced serving cell change in accordance with an aspect of the claimed subject matter. Method 700 can commence at 702 where an access terminal can be informed by a base station that it (e.g., the access terminal) needs to perform a serving cell change. Based at least in part on the indication received from the base station, the access terminal can perform a serving cell change and a MAC-hs/ehs reset as indicated at 704. The serving cell change and the MAC-hs/ehs reset indicated at 704 can be effectuated regardless of whether or not the access terminal is traversing between cells controlled by the same base station (e.g., intra-Node B) or cells controlled by different base stations (e.g., inter-Node B).

Figure 8:
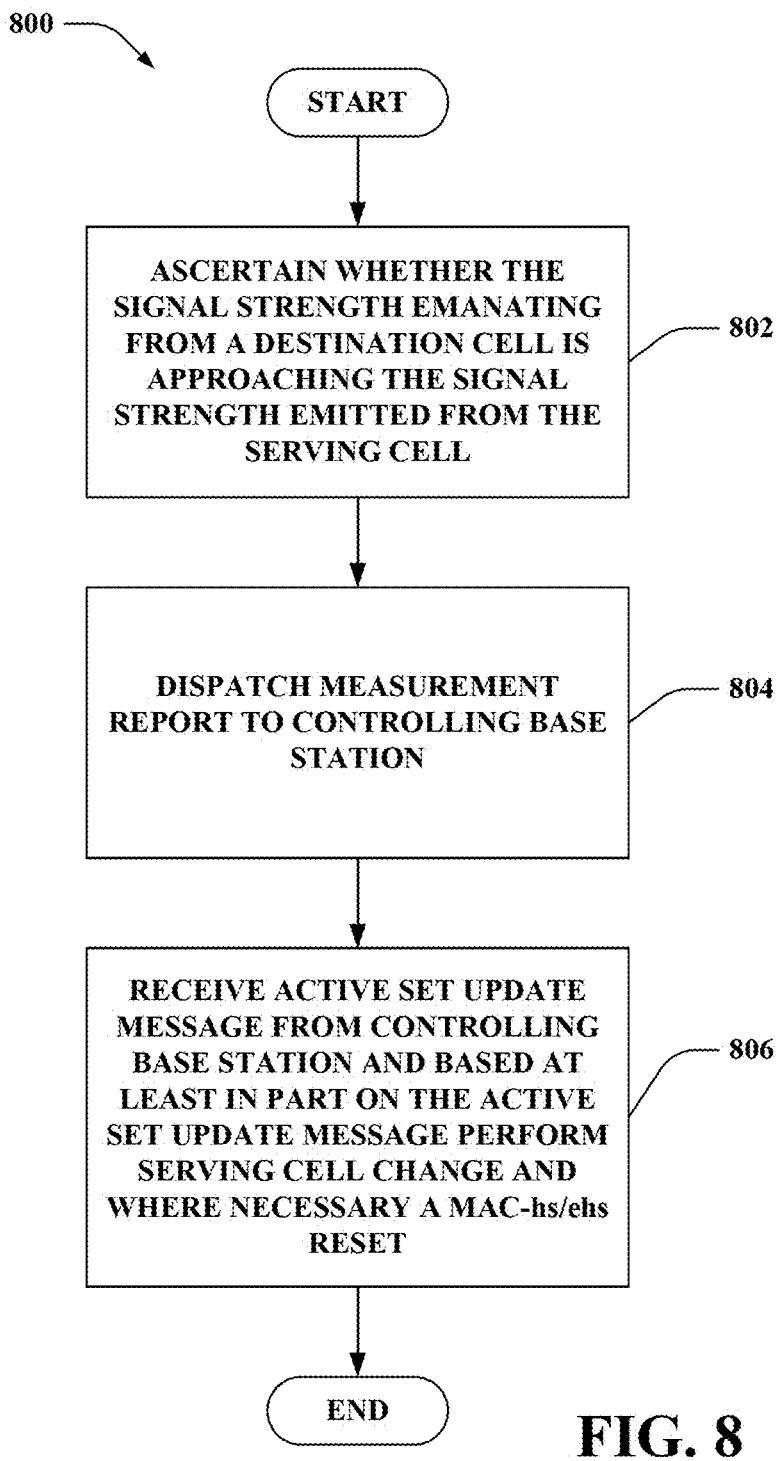

FIG. 8 illustrates a methodology 800 that facilitates or effectuates the handling of MAC-hs/ehs resets in an enhanced serving cell change in accordance with an aspect of the claimed subject matter. Methodology 800 can commence at 802 where an access terminal can ascertain whether the signal strength emanating from a destination cell is approaching the signal strength emitted from the current serving cell. At 804 the access terminal can dispatch a measurement report to the controlling or servicing base station. At 806 the access terminal can receive an active set update message from the controlling or servicing base station, and based at least in part in the received active set update message, the access terminal can perform a serving cell change, and if necessary (e.g., when the access terminal is traversing between cells controlled or serviced by different base stations) effectuate a MAC-hs/ehs reset.

Figure 9:
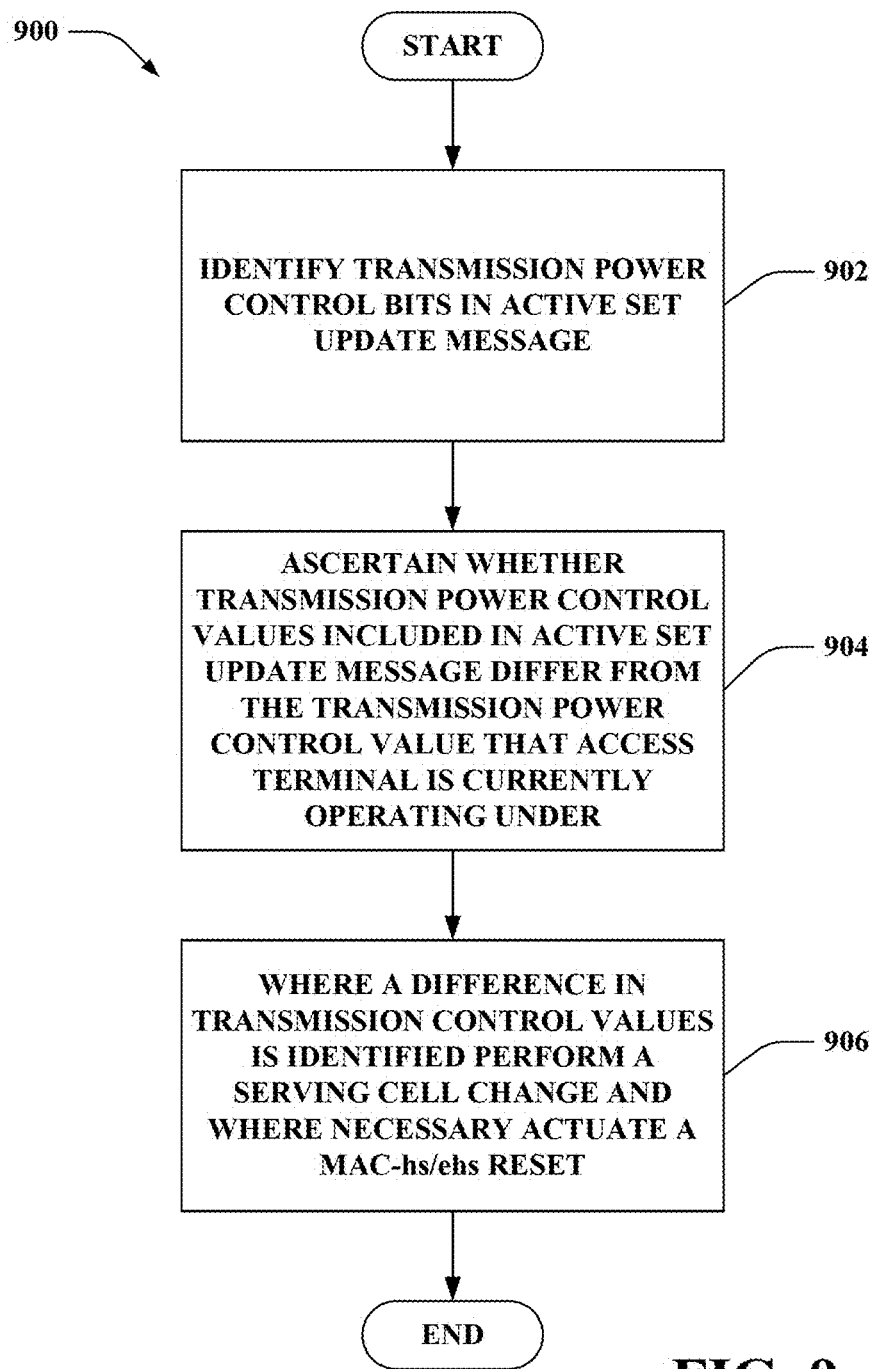

FIG. 9 illustrates a further methodology 900 that actuates the handling of MAC-hs/ehs resets in an enhanced serving cell change in accordance with an aspect of the claimed subject matter. Methodology 900 can commence at 902 where an access terminal can identify transmission power control (TPC) bits received from its currently controlling base station and included in an active set update message. At 904 the access terminal can ascertain whether or not the transmission power control values included in the active set update message received from its currently controlling base station differ from the transmission power control values that the access terminal is currently operating under. At 906 where a difference in the transmission control values is identified, the access terminal can perform a serving cell change, and where necessary (e.g., when the access terminal is to be controlled by a base station different from the currently controlling base station) actuate a MAC-hs/ehs reset.

Figure 10:
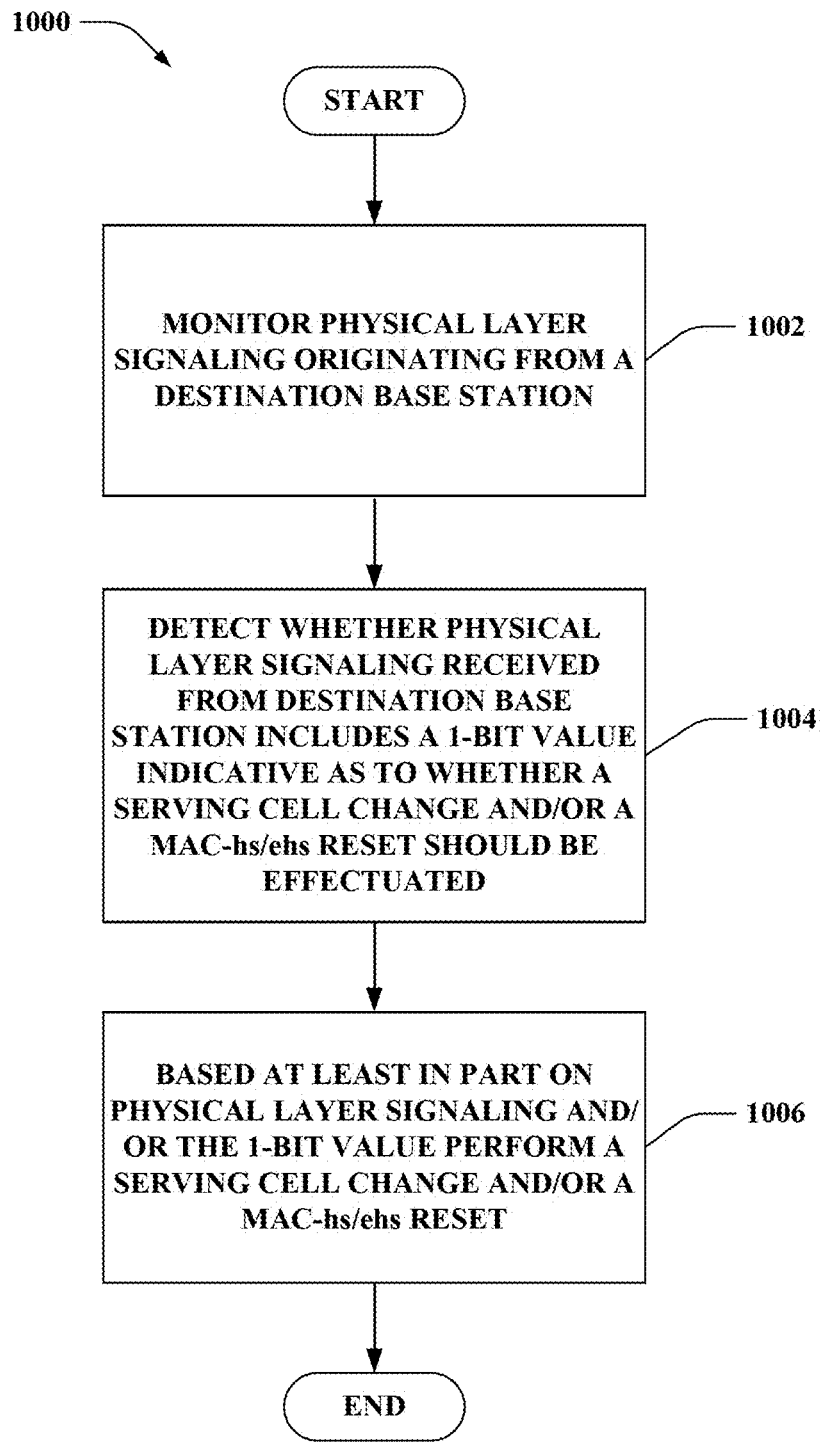

FIG. 10 illustrates a methodology 1000 that effectuates the handling of MAC-hs/ehs reset in an enhanced serving cell change in accordance with a further aspect of the claimed subject matter. Methodology 1000 can commence at 1002 where the access terminal can monitor (e.g., intermittently and/or continuously) physical layer signaling originating from a destination base station. At 1004 access terminal can detect whether the physical layer signaling received from the destination base station includes a 1-bit value indicative as to whether or not a serving cell change and/or a MAC-hs/ehs should be effectuated. At 1006, based at least in part on the physical layer signaling and/or the 1-bit value included with the physical layer signaling obtained from the destination base station, the access terminal can initiate a serving cell change, and where necessary perform a MAC-hs/ehs reset.

It will be appreciated that, in accordance with one or more aspects described herein, inferences can be made regarding handling of MAC-hs/ehs resets in an enhanced serving cell change. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
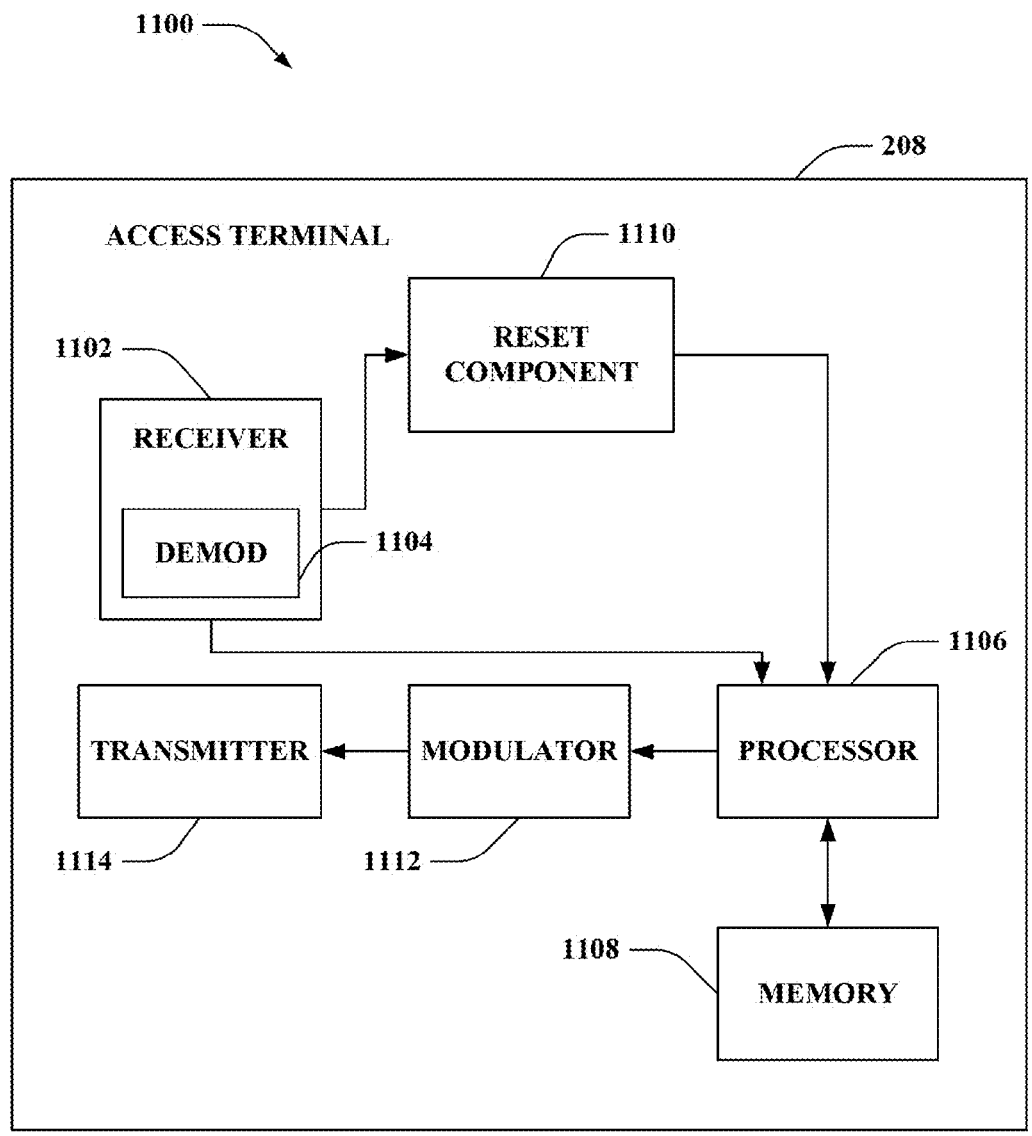
FIG. 11 is an illustration of an example access terminal that effectuates and/or facilitates MAC hs/ehs resets associated with an enhanced serving cell change in a wireless communication system.

FIG. 11 is an illustration 1100 of an access terminal 208 that facilitates the handling of MAC-hs/ehs resets in an enhanced serving cell change. Access terminal 208 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1114, a processor that controls one or more components of access terminal 208, and/or a processor that both analyzes information received by receiver 1102, generates information for transmission by transmitter 1114, and controls one or more components of access terminal 208.

Access terminal 208 can additionally comprise memory 1108 that is operatively coupled to processor 1106 and that can store data to be transmitted, received data, and any other suitable information related to performing the various actions and functions set forth herein. For instance, memory 1108 can store group-specific signaling constraints employed by one or more base stations. Memory 1108 can additionally store protocols and/or algorithms associated with identifying signaling constraints used for communicating resource block assignments and/or employing such signaling constraints to analyze received assignment messages.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a reset component 1110 which can be substantially similar to reset component of FIG. 3. Reset component 1110 can be employed to facilitate transmission of circuit switched voice over packet switched networks. Access terminal 208 still further comprises a modulator 1112 and a transmitter 1114 that transmits the signal to, for instance, a base station, another access terminal, etc. Although depicted as being separate from the processor 1106, it is to be appreciated that reset component 1110 and/or modulator 1112 can be part of processor 1106 or a number of processors (not shown).

Figure 12:
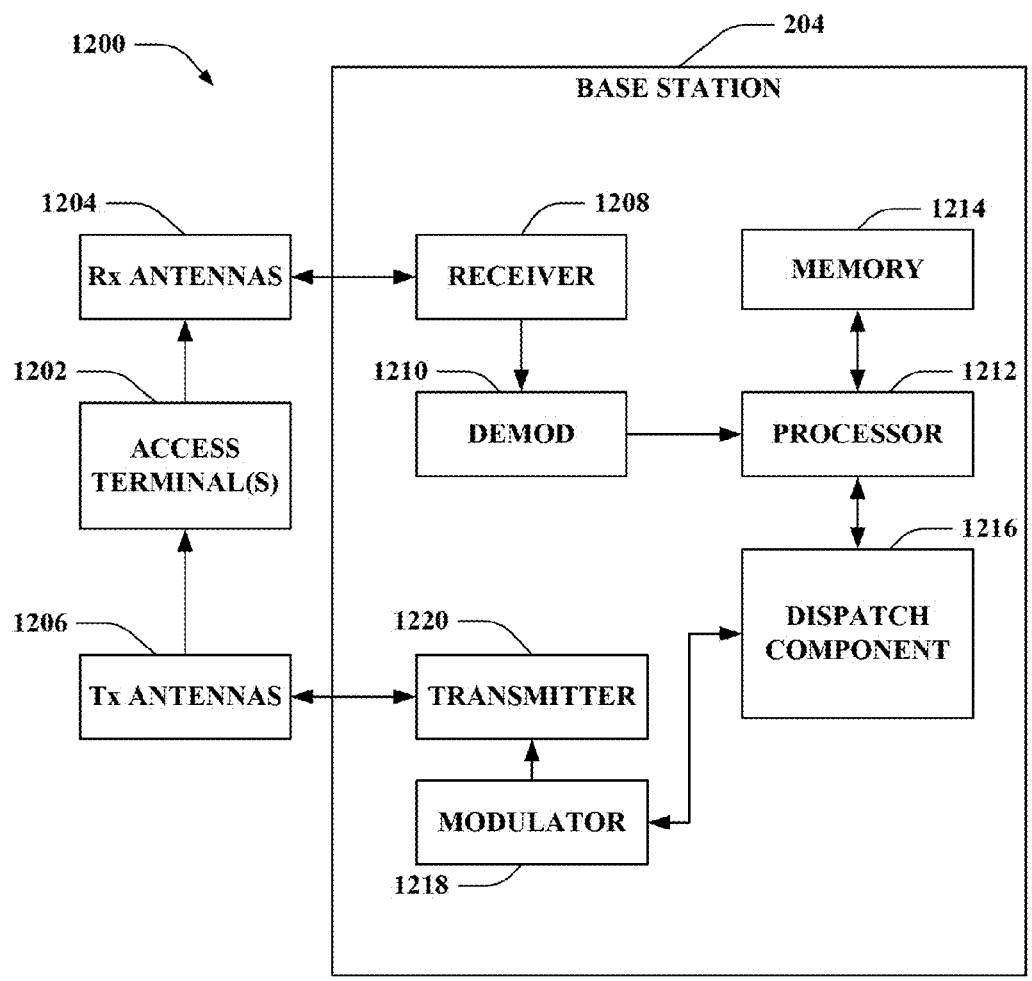
FIG. 12 is an illustration of an example system that effectuates and/or facilitates MAC hs/ehs resets associated with an enhanced serving cell change in a wireless communication environment.

FIG. 12 is an illustration of a system 1200 that facilitates the handling of MAC-hs/ehs resets in an enhanced serving cell change. System 1200 comprises a base station 204 (e.g., access point, . . . ) with a receiver 1208 that receives signal(s) from one or more access terminals 208 through a plurality of receive antennas 1204, and a transmitter 1220 that transmits to the one or more access terminals 1202 through a transmit antenna 1206. Receiver 1208 can receive information from receive antennas 1204 and is operatively associated with a demodulator 1210 that demodulates received information. Demodulated symbols are analyzed by a processor 1212 that can be similar to the processor described above with regard to FIG. 11, and which is coupled to a memory 1214 that stores data to be transmitted to or received from access terminal(s) 1202 (or a disparate base station (not shown)) and/or any other suitable information related to performing the various actions and functions set forth herein. Processor 1212 is further coupled to a dispatch component 1216 that can include the functionalities and/or facilities set forth above in relation to active set component 302 and/or update component 304. Further, dispatch component 1216 can provide information to be transmitted to a modulator 1218. Modulator 1218 can multiplex a frame for transmission by a transmitter 1220 through antennas 1206 to access terminal(s) 1202. Although depicted as being separate from the processor 1212, it is to be appreciated that dispatch component 1216 and/or modulator 1218 can be part of processor 1212 or a number of processors (not shown).

Figure 13:
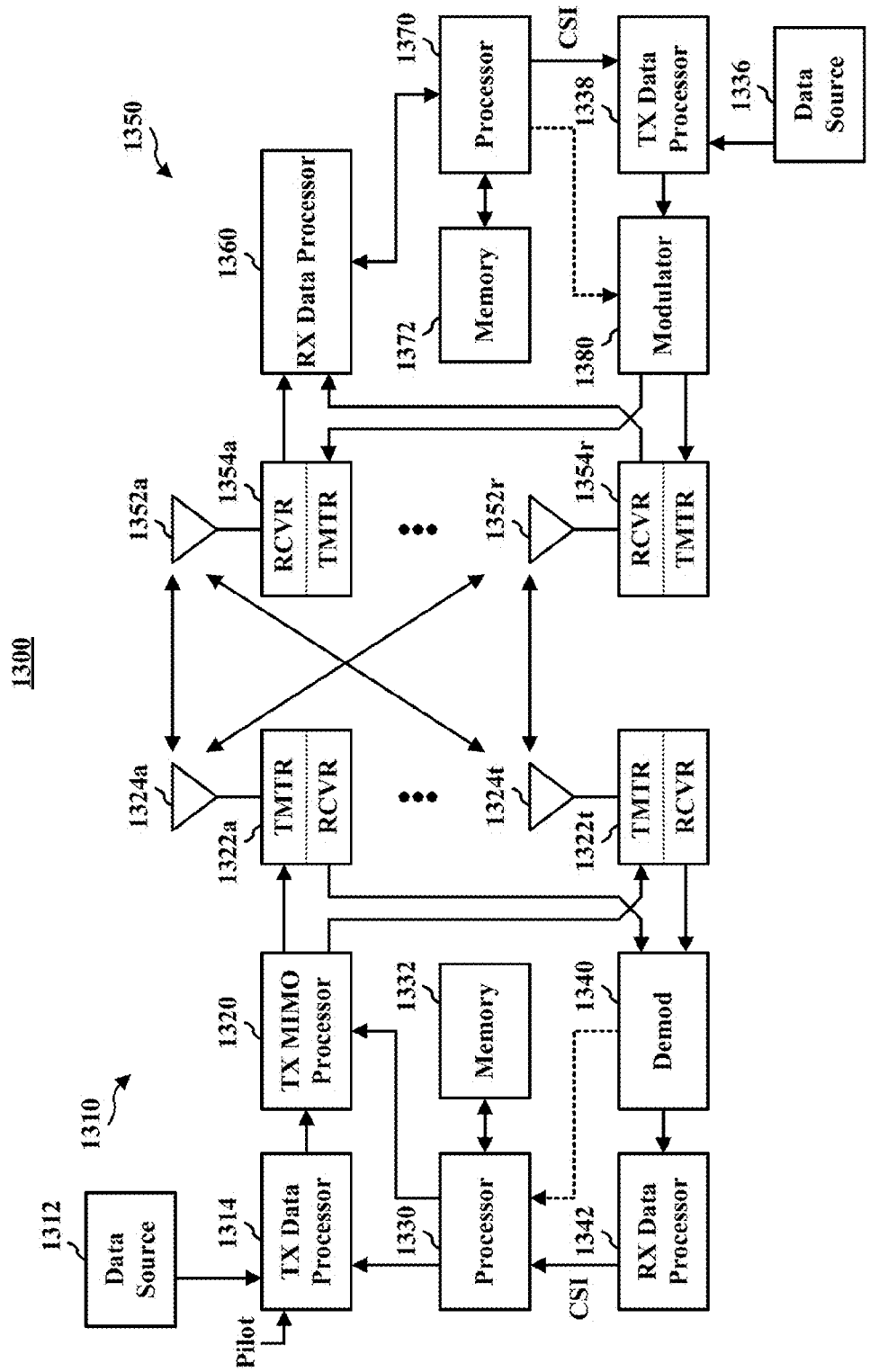
FIG. 13 is an illustration of an example wireless network environment that can be employed in conjunction with the various systems and methods described herein.

FIG. 13 shows an example wireless communication system 1300. The wireless communication system 1300 depicts one base station 1310 and one access terminal 1350 for sake of brevity. However, it is to be appreciated that system 1300 can include more than one base station and/or more than one access terminal, wherein additional base stations and/or access terminals can be substantially similar or different from example base station 1310 and access terminal 1350 described below. In addition, it is to be appreciated that base station 1310 and/or access terminal 1350 can employ the systems (FIGS. 1-6) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At access terminal 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from access terminal 1350 are received by antennas 1324, conditioned by receivers 1322, demodulated by a demodulator 1340, and processed by a RX data processor 1342 to extract the reverse link message transmitted by access terminal 1350. Further, processor 1330 can process the extracted message to determine which precoding matrix to use for determining the beamforming weights.

Processors 1330 and 1370 can direct (e.g., control, coordinate, manage, etc.) operation at base station 1310 and access terminal 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
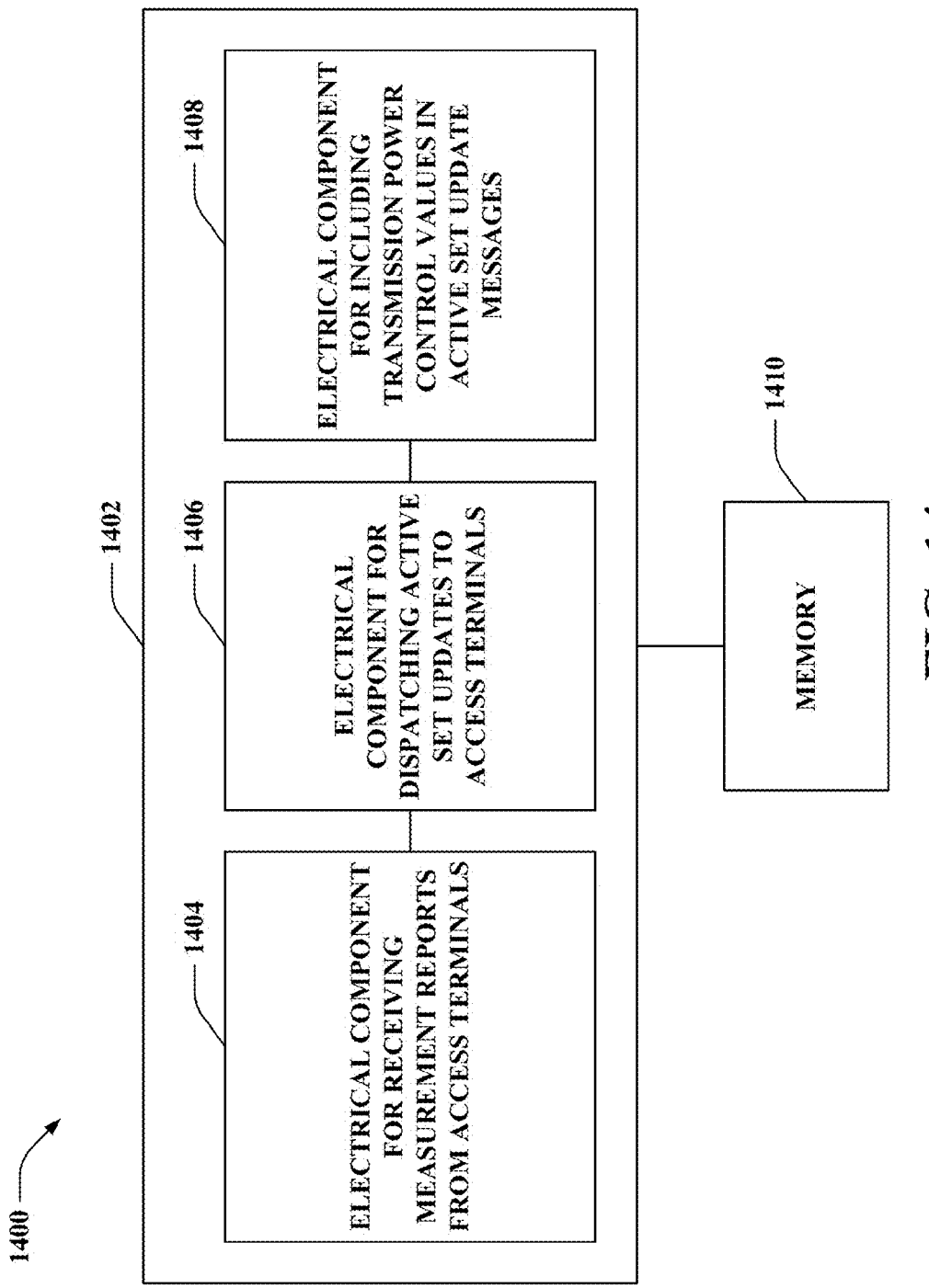
FIG. 14 is an illustration of an example system that facilitates MAC hs/ehs resets associated with an enhanced serving cell change in a wireless communication environment.

With reference to FIG. 14, illustrated is a system 1400 that effectuates handling of MAC-hs/ehs resets in an enhanced serving cell change in a wireless communication environment. For example, system 1400 can reside at least partially within a base station. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving measurement reports from access terminals 1404. For instance, the information can be transferred over a broadcast channel (e.g., dynamic Broadcast Channel (BCH), . . . ). Further, the information can relate to group-specific minimum allocation units, group-specific signaling structures, number of groups, number of resource blocks within respective groups, and so forth. Further, logical grouping 1402 can include an electrical component for dispatching active set updates to access terminals 1406. Moreover, logical grouping 1402 can comprise an electrical component for including transmission power control values in active set update messages 1408. For example, the indication can be transferred over a control channel (e.g., Physical Downlink Control Channel (PDCCH), . . . ). Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
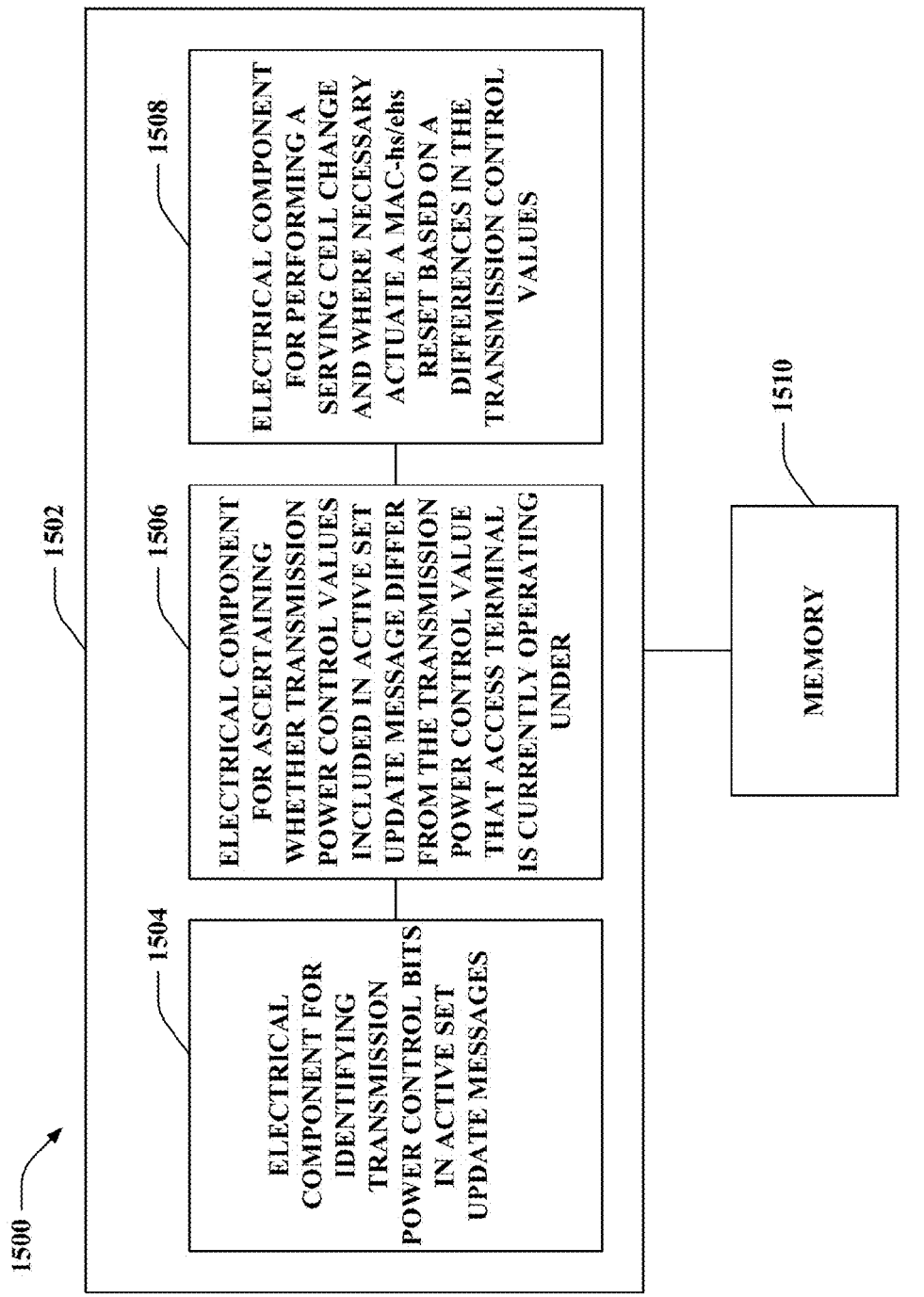
FIG. 15 is an illustration of an example system that effectuates MAC hs/ehs resets associated with an enhanced serving cell change in a wireless communication environment.

Turning to FIG. 15, illustrated is a system 1500 that actuates handling of MAC-hs/ehs resets in an enhanced serving cell change in a wireless communication environment. System 1500 can reside within an access terminal, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for obtaining information pertaining to group-specific signaling constraints for identifying transmission power control bits in active set update messages 1504. Further, logical grouping 1502 can include an electrical component for ascertaining whether transmission power control values included in active set update messages differ from the transmission power control value that the access terminal is currently operating under 1506. Moreover, logical grouping 1502 can include an electrical component for performing a serving cell change and where necessary actuate a MAC-hs/ehs reset based at least in part on differences in the transmission control values 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless communication system, the apparatus comprising:
a processor, configured to identify a transmission power control combination index included in an active set update message, ascertain whether a value from the transmission power control combination index differs from the value that the apparatus is currently using, and, based at least in part on an examination of the values from the transmission power control combination index, perform a serving cell change that includes undertaking a media access control status reset; and
a memory coupled to the processor for persisting data.

2. The apparatus of claim 1, wherein the active set update message is dispatched from a base station to which the apparatus will transition.

3. The apparatus of claim 1, wherein the active set update message is dispatched to the apparatus based at least in part on a measurement report sent to a base station servicing a cell within which the apparatus is currently located.

4. The apparatus of claim 3, wherein the measurement report indicates that a signal strength associated with the cell is diminishing relative to a further cell.

5. The apparatus of claim 4, wherein the further cell is serviced by at least one of the base station or another base station.

6. The apparatus of claim 5, wherein the base station directs the apparatus to add the further cell to an active set maintained by the apparatus.

7. A method utilized in wireless communication systems, the method comprising:
identifying a transmission power control combination index included in an active set update message;
ascertaining whether a value from the transmission power control combination index differs from the value that is currently being used; and
based at least in part on an examination of the values from the transmission power control combination index, performing a serving cell change that includes undertaking a media access control status reset.

8. The method of claim 7, wherein a transmission power control bit indicates the transmission power control index.

9. The method of claim 7, wherein the active set update message is received at a mobile station from a base station that services a first cell into which the mobile station is transitioning.

10. The method of claim 9, wherein a signal strength associated with the first cell is approaching the signal strength of a second cell controlled by the base station.

11. The method of claim 10, wherein the signal strength associated with the first cell and the signal strength of the second cell are included in a measurement report dispatched to the base station.

12. The method of claim 11, wherein based at least in part on the measurement report, the mobile station receives an instruction from the base station to add the first cell to an active set maintained by the mobile station.

13. An apparatus operable in wireless communication systems, the apparatus comprising:
means for identifying a transmission power control combination index included in an active set update message;
means for ascertaining whether a value from the transmission power control combination index differs from the value that is currently being used; and
means for performing a serving cell change that includes undertaking a media access control status reset based at least in part on an examination of the values from the transmission power control combination index.

14. The apparatus of claim 13, wherein the means for identifying receives the active set update message from a base station that will subsequently service the means for receiving.

15. The apparatus of claim 14, wherein the means for ascertaining further determines whether the transmission power control value is similar to the transmission power control value that the means for receiving is currently subject to.

16. A computer program product, comprising:
a non-transitory computer-readable medium, comprising:
code for identifying a transmission power control combination index included in an active set update message;
code for ascertaining whether a value from the transmission power control combination index differs from the value that is currently being used; and
code for performing a serving cell change that includes undertaking a media access control status reset based at least in part on an examination of the values from the transmission power control combination index.

17. The computer program product of claim 16, wherein the transmission power control index is received at a mobile station from a base station in response to a measurement report dispatched from the mobile station.

18. The computer program product of claim 17, wherein the measurement report indicates that a relative signal strength between a first cell serviced by the base station and a second cell serviced by a disparate base station is diminishing.

19. The computer program product of claim 18, further comprising code for adding the second cell to an active set persisted or maintained by the mobile station in response to an instruction received from the base station.

20. A method for a mobile station undergoing a serving cell change to determine whether or not to reset a media access control status, comprising:
identifying a transmission power control combination index included in an active set update message;
comparing the ascertained transmission power control combination index to a transmission power control combination index currently being used; and
performing a media access control status reset when the serving cell changes and the ascertained transmission power control combination index is different than the transmission power control combination index currently being used.

* * * * *